(12) United States Patent
Buttini et al.

(10) Patent No.: US 11,412,743 B2
(45) Date of Patent: Aug. 16, 2022

(54) READY-TO-EAT BAKED PIZZA WHICH CAN BE STORED AT ROOM TEMPERATURE AND PROCESS FOR THE PRODUCTION THEREOF

(71) Applicant: Barilla G. e R. Fratelli S.p.A., Parma (IT)

(72) Inventors: Roberto Buttini, Parma (IT); Alessandro Ruggeri, Paris (FR); Giancarlo Riboldi, Sorbolo (IT); Corrado Ferrari, Parma (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 208 days.

(21) Appl. No.: 15/661,462

(22) Filed: Jul. 27, 2017

(65) Prior Publication Data

US 2018/0042246 A1 Feb. 15, 2018

(30) Foreign Application Priority Data

Aug. 9, 2016 (IT) .................. 102016000083694

(51) Int. Cl.
| | |
|---|---|
| *A21D 13/41* | (2017.01) |
| *A21D 15/00* | (2006.01) |
| *A21D 6/00* | (2006.01) |
| *A21D 8/06* | (2006.01) |

(52) U.S. Cl.
CPC .............. *A21D 13/41* (2017.01); *A21D 6/00* (2013.01); *A21D 8/06* (2013.01); *A21D 15/00* (2013.01)

(58) Field of Classification Search
None
See application file for complete search history.

(56) References Cited

U.S. PATENT DOCUMENTS

| | | | | |
|---|---|---|---|---|
| 5,202,138 A | * | 4/1993 | Stypula .................. | A23P 20/12 426/293 |
| 2013/0101698 A1 | * | 4/2013 | Coleman ................ | A21D 2/183 426/20 |

FOREIGN PATENT DOCUMENTS

| | | |
|---|---|---|
| EP | 1036501 A2 | 9/2000 |
| EP | 1042956 A1 | 10/2000 |
| EP | 1133920 A1 | 9/2001 |
| WO | 2011109300 A1 | 9/2011 |

OTHER PUBLICATIONS

Slocum, C., "Homemade Pizza Dough"—Country Living, https://www.countryliving.com/food-drinks/recipes/a3762/homemade-pizza-dough-recipe-clv0911/, Aug. 2011, downloaded Aug. 28, 2019. (Year: 2011).*
Emiko Davies, "Pizza with Homemade Mascarpone & Speck"—http://www.emikodavies.com/blog/pizza-with-homemade-mascarpone-speck/, Mar. 2014, downloaded Aug. 28, 2019. (Year: 2014).*
International Search Report for Italian Application No. IT 201600083694 (2 Pages) (dated Mar. 8, 2017).

* cited by examiner

*Primary Examiner* — Elizabeth Gwartney
(74) *Attorney, Agent, or Firm* — Lucas & Mercanti, LLP

(57) ABSTRACT

A ready-to-eat baked pizza packaged for long-term storage at room temperature, having an appearance and organoleptic properties comparable to those of a freshly made pizza is disclosed. A process for obtaining a ready-to-eat packaged pizza which can be stored at room temperature, according to the invention, is also described.

19 Claims, 2 Drawing Sheets

READY-TO-EAT BAKED PIZZA WHICH CAN BE STORED AT ROOM TEMPERATURE AND PROCESS FOR THE PRODUCTION THEREOF

CROSS-REFERENCE TO RELATED APPLICATIONS

This application claims the benefit of Italian Patent Application No. 102016000083694 filed Aug. 9, 2016, the contents of which are incorporated herein by reference.

FIELD OF APPLICATION

The present invention relates to the technical sector of the food industry and relates, in particular, to a ready-to-eat baked oven product. More particularly, the present invention relates to a packaged snack which can be stored at room temperature and which consists of a ready-to-eat pizza. The present invention also relates to a process for the production of this snack.

BACKGROUND OF THE INVENTION

Pizza is a typical Italian oven product which is very well-known and popular both in Italy and abroad.

Pizza is produced from the kneading of a dough comprising wheat flour, salt, yeast and optionally olive oil; the dough is spread out into a thin—generally circular—layer onto which a "topping" is deposited.

The ingredients of this topping, which vary greatly, at least in Italy, where the preparation of this food product is based more so than in other countries on traditional cooking recipes, includes so-called "pasta filata" cheese (pulled-curd cheese), tomato-based sauce and extra virgin olive oil.

Pizza is a foodstuff which is traditionally eaten not only as main meal, but, depending on how it is portioned, also as a snack in between meals.

Similarly, the habit of eating freshly baked pizza segments, pizza slices or round small pizzas ("pizzetta") is particularly widespread not only in Italy, but also abroad. All these food products may be easily and typically purchased from pizzerias, bakeries, pastry shops and/or the bakery and gastronomic food departments in markets and supermarkets, especially in Italy.

However, pizza is a perishable food product and must be necessarily eaten while it is still fresh, preferably as soon as it has been taken out of the oven; sliced pizzas, round pizzettas or similar take-away products have a shelf-life generally of no more than 24 hours at room temperature. In fact, already a few hours after the pizza is taken out of the oven, its properties, i.e. consistency when eaten and organoleptic properties, as regards both the cooked dough base and the topping ingredients start to deteriorate gradually. This deterioration of the product is due to both exogenous factors, such as oxidation of the product due to the atmospheric oxygen, the relative humidity of the air, the storage temperature or microorganisms from the external environment, and endogenous factors. The endogenous factors include in particular the migration of the moisture and the liquid component in general between the cooked dough base and the various components of the topping, as well as the components of the topping itself.

Obviously, this represents a limitation since the pizza, in order for it not to lose its typical taste and aroma characteristics, must be eaten within a few hours of its preparation.

There therefore exists a particular need on the part of the consumer to have a pizza or pizzetta which is suitable for being eaten also weeks or months after it has been prepared, without the need to observe special conditions for storage thereof.

In an attempt to meet this need, the food industry has devised various solutions, such as those of providing, both for catering applications and for sale in supermarkets, refrigerated or frozen, baked or semi-baked, pizzas or pizzettas which may be packaged in a modified atmosphere.

However, these products require baking or at least defrosting/heating by the consumer or the caterer in order to complete preparation thereof, just before being eaten.

Consequently, these products impose a limitation compared to the convenience of being able to have a pizzetta which is ready to eat at any time, in particular when there is no suitably equipped kitchen available, for example in a school or working environment, or when travelling.

U.S. Pat. No. 4,416,904 discloses a pizza which can be stored at room temperature and consists of a baked dough base and a topping comprising cheese and a tomato sauce. This pizza can be stored for about 8 weeks and does not require further baking before being eaten, other than heating, the pizza base being already cooked.

In any case, insofar as no reference is made to storage techniques by means of freezing or use of modified atmospheres, it should be pointed out that the elements which make up the pizza described in U.S. Pat. No. 4,416,904, i.e. the dough base, the cheese and the tomato sauce, all necessarily contain an antifungal agent, for example calcium or sodium propionate or sorbic acid or derivatives thereof.

Moreover, among the various drawbacks, the product described in the aforementioned patent is subject to a transformation in the composition and consistency of its various components during its shelf-life, in particular one obvious occurrence is the migration of the moisture from the tomato sauce to the baked dough base.

Therefore, the technical problem forming the basis of the present invention is to provide a packaged baked pizza, which has an appearance and organoleptic qualities comparable to those of a freshly made pizza, which has a long shelf-life at room temperature, which maintains during the whole storage period its particular appearance, its consistency when eaten and organoleptic properties and which at the same time is ready to eat, namely does not require any treatment in order to complete its preparation before being eaten.

SUMMARY OF THE INVENTION

The aforementioned technical problem has therefore been solved by providing a ready-to-eat baked pizza packaged for long-term storage at room temperature, having an appearance and organoleptic properties comparable to those of a freshly made pizza, having a base of soft baked dough and a surface topping comprising cheese, said topping being free of preservatives and said base and said surface topping having a substantially equivalent water activity (Aw).

Preferably, the water activity (Aw) of the aforementioned baked pizza is between 0.82 and 0.92, more preferably between 0.84 and 0.88, and even more preferably equal to about 0.86. Furthermore, the aforementioned pizza has an overall moisture content with a value of between 25% and 35% by weight of the total weight of the pizza, and preferably equal to about 28% by weight of the total weight of the pizza.

Accordingly, the water activity (Aw) of the aforementioned base and that of the aforementioned topping, after baking, are respectively between 0.80 and 0.92, more preferably between 0.84 and 0.88, and even more preferably equal to about 0.86.

The soft baked dough base of the pizza according to the invention has a moisture content with a value of between 25% and 35% by weight of the total weight of the base of the aforementioned pizza and preferably equal to about 30% by weight of the total weight of the base of the aforementioned pizza.

The aforementioned soft baked dough base generally comprises flour, natural yeast and cooking salt. Preferably the flour is type "0" soft wheat flour; the natural yeast is preferably brewer's yeast. The baked dough base may also comprise apple cider vinegar, vegetable oils and/or fats and a baking processing aid.

More specifically, this flour may be chosen from among any cereal flour, preferably in the group consisting of hard wheat, soft wheat, Khorasan wheat (*Triticum turgidum* ssp. *turanicum*), rye, corn, rice, spelt, barley, sorghum, millet, oat, triticale, buckwheat, *quinoa* and mixtures thereof, and even more preferably, type "0" soft wheat flour.

Preferably, these vegetable oils and/or fats and/or fractions thereof are chosen from the group consisting of palm oil, olive oil, sunflower oil, rapeseed oil and combinations thereof, preferably extra virgin olive oil, high oleic sunflower oil and a mixture of these. More preferably, these vegetable oils and/or fats and/or their fractions are a mixture of extra virgin olive oil and high oleic sunflower oil. More preferably, the soft baked dough base according to the present invention comprises a quantity of extra virgin olive oil equal to between 1% and 10% by weight of the total weight of the aforementioned base and a quantity of high oleic sunflower oil equal to between 1% and 10%.

Even more preferably, the soft baked dough base according to the present invention comprises a quantity of extra virgin olive oil equal to 5% by weight of the total weight of the aforementioned base and a quantity of high oleic sunflower oil equal to 5%.

The baking processing aid is preferably a baking improvement agent based on ascorbic acid and/or enzymes.

Another advantageous feature is the absence of moistening agents in the soft baked dough base without reducing the shelf-life of the product. These moistening additives are usually present in soft baked dough oven products, also in soft dough oven products which can be generally classified as "savoury products". The most commonly used moistening agents are simple sugars or polyols. As a result of this characteristic feature it is possible to obtain a product with improved nutritional characteristics, which is mainly suited for infants' diets, which is often excessively rich in simple sugars.

The aforementioned baked pizza topping according to the present invention has a water activity (Aw) of between 0.80 and 0.92, more preferably between 0.84 and 0.88, and even more preferably equal to about 0.86 and has a moisture content with a value of between 20% and 24% by weight of the total weight of the topping, and preferably equal to about 22% by weight of the total weight of the topping.

"Cheese" is understood as meaning not only a single type of cheese, but also a mixture of several cheeses.

Preferably, the aforementioned topping also comprises mascarpone and conveniently the aforementioned cheese and the mascarpone are contained in the aforementioned topping in a weight ratio of between 75:25 and 85:15, and more preferably equal to about 80:20.

Preferably, the aforementioned cheese is an unripened cheese and in a particularly preferred manner is a soft cheese with a creamy consistency, comprising pasteurized milk, milk cream and salt.

In accordance with a particular embodiment of the baked pizza according to the present invention, the topping of the oven product according to the present invention further comprises a tomato-based sauce. More specifically, this topping may have two separate phases, a cheese-based phase and a phase of tomato-based sauce, in close contact with each other, but having a characteristic defined interface.

Preferably, said phase of tomato-based sauce has a water activity (Aw) of between 0.80 and 0.92, more preferably between 0.84 and 0.88, and even more preferably equal to about 0.86.

Moreover, the aforementioned phase of tomato-based sauce of the baked pizza according to the invention has a moisture content with a value of between 36% and 40% by weight of the total weight of the phase of tomato-based sauce and preferably equal to about 38% by weight of the total weight of the aforementioned phase of tomato-based sauce. In accordance with the aforementioned particular embodiment of the present invention, the cheese-based phase and the phase of tomato-based sauce have a substantially equivalent water-activity (Aw).

Preferably, the phase of tomato-based sauce may in turn comprise emulsifiers; even more preferably these emulsifiers may be derivatives of the alimentary fatty acids, more specifically they may be mono and diglycerides of fatty acids, such as glyceryl monostearate or glyceryl distearate or any mixture thereof. These emulsifiers may be present in a quantity by weight of between 0.30% and 0.7%, more preferably between 0.45% and 0.55%, of the total weight of the phase of tomato-based sauce.

Advantageously, the presence of emulsifiers in the phase of tomato-based sauce allows the fatty component to be emulsified and prevents migration of the fatty component from the tomato sauce to the cheese-based phase, or from the tomato sauce to the soft baked dough base.

More specifically, in addition to the fatty matter from the added extra virgin olive oil, the tomato sauce contains lycopene which gives the sauce its typical red color. During the prolonged shelf-life of the product the lycopene may be easily transferred both to the soft baked dough base, which comprises a significant percentage of fats, and to the cheese-based phase, which also comprises a significant percentage of fats and therefore lipophilic matter.

The migration of the lycopene from the sauce to the tomato would result in an irreversible change in the coloring of the soft dough base and/or the cheese-based phase, altering the perception of freshness and desirability of the product in the critical eyes of the consumer.

In accordance with an embodiment of the present invention, said phase of tomato-based sauce may comprise stabilizing additives, and preferably may comprise wheat maltodextrin.

This phase of tomato-based sauce generally comprises tomato pulp, tomato concentrate, extra virgin olive oil and cooking salt; it may also comprise dried glucose syrup and sucrose.

In accordance with a further embodiment of the present invention, the topping of the pizza according to the present invention may also comprise at least one ingredient chosen from the group consisting of aromatic herbs, vegetables, fruit, mushrooms, cereal grains, meat, fish and any combination of these elements. Preferably, the pizza topping comprises at least one ingredient chosen from the group consisting of oregano, basil, rosemary, dehydrated tomatoes, olives, capers, onions, artichokes, mushrooms, anchovies and cured meats.

Of the ingredients listed above whole or chopped olives and oregano are particularly preferred.

The pizza according to the invention is in the form of traditional round small pizza ("pizzetta") with a diameter of between 5 and 18 cm, preferably of between 8 cm and 14 cm.

The pizza according to the invention preferably comprises an edge which extends along the whole length of the circumference of the pizza. This edge has preferably a thickness of between 0.5 cm and 1.5 cm and in any case about 200% greater than the thickness of the pizza in its central part; at the same time, this edge has preferably a width of between 0.5 cm and 1.5 cm.

This edge, in addition to providing the pizza with an added value from an aesthetic point of view, allows the contact of the topping with the surfaces of the external packaging to be reduced. Consequently, in an extremely advantageous manner, this expedient is designed to prevent the topping adhering to the covering film inside which the pizza is packaged and stored during the shelf-life of the product. It would be highly unappealing for the consumer to open the packaging and find a product with a topping not uniformly distributed on the surface and partly stuck to the protective film. Moreover, this situation would be a major drawback in particular if the packaging were transparent and allowed the product to be visible from the outside.

Preferably, the pizza is packaged in a package of the type having a metallized film with air and light barrier properties, for example a plastic multipack, optionally inserted in turn inside a cardboard packaging (box).

Preferably, the baked pizza according to the present invention is stored at room temperature and inside its own sealed package for at least 60 days, more preferably for at least 90 days, and even more preferably for a period of at least 120 days.

The aforementioned technical problem has moreover been solved by providing a process for the production of ready-to-eat baked pizza packaged for long-term storage at room temperature, having an appearance and organoleptic properties comparable to those of a freshly made pizza, having a base of soft baked dough and a surface topping comprising cheese, the aforementioned topping being free of preservatives and the aforementioned base and aforementioned surface topping having a substantially equivalent water activity (Aw), the process comprising the following steps:

a) preparing a pizza dough,
b) forming said pizza dough into a disk of dough;
c) allowing the aforementioned disk of dough to stand (rise) for a time period of between 25 minutes and 35 minutes, at a temperature of between 20° C. and 24° C. and in an atmosphere with a relative humidity of between 40% and 60%;
d) pressing (punching) the aforementioned disk of dough, once it has been allowed to rise, by means of a press with a circular section so as to obtain a pressed disk of dough with a raised circular edge;
e) depositing onto the disk of dough, inside the aforementioned raised edge, a topping comprising cheese, thus obtaining a topped disk, the aforementioned cheese having preferably a water activity (Aw) of between 0.94 and 0.98;
f) allowing the aforementioned topped disk to rise at a temperature of between 30° C. and 38° C. for a time period of between 70 minutes and 90 minutes and in an atmosphere with a relative humidity of between 85% and 95%;
g) baking the aforementioned topped and risen disk in an oven at a temperature of between 180 and 220° C., preferably for a time period of between 8 minutes and 15 minutes, so as to obtain a baked pizza;
h) allowing the aforementioned baked pizza to cool to room temperature;
i) packaging the aforementioned baked pizza.

Preferably, in the aforementioned step a) the aforementioned mixing comprises a first stage of slow mixing and a second stage of fast mixing within a kneader which works at a speed of between 10 and 20 rpm during the aforementioned slow mixing stage and the speed of between 40 and 60 rpm during the aforementioned fast mixing stage.

Moreover, during the aforementioned step a) the dough may be prepared by mixing the following ingredients, by weight of the total weight of the dough: 50-65% flour, 23-32% water, 7-12% vegetable fats and/or oils and/or fractions thereof, of which preferably 1-3% extra virgin olive oil, 1-4% yeast, preferably brewer's yeast, 0.1-3% cooking salt, 0.2-0.8% apple cider vinegar, and 0-0.1% baking processing aid.

In accordance with a particular embodiment according to the invention, during the aforementioned step b), the pizza dough thus prepared may undergo a forming procedure by means of rolling. During this procedure, a continuous layer with a thickness of between about 5 mm and about 15 mm is obtained. This continuous layer is then passed through a series of sizing rollers to obtain a sheet of dough with a thickness of between about 3 mm and about 11 mm.

Between 2 and 8 sheets thus obtained are superimposed on each other. This is followed by a rolling step to obtain a rolled dough with a final thickness of between 4 mm and 8 mm. Finally, the dough is subjected to a pressing step, thus forming the aforementioned disks.

In accordance with an alternative embodiment, during the aforementioned step b), the pizza dough thus prepared may undergo a forming procedure by means of dividing. During this procedure, the dough is divided up by means of a divider-rounder into balls with a weight of 26 g. The balls thus obtained are then rolled to obtain disks with a diameter of between 85±3 mm and height of 6±2 mm.

This latter alternative forming method is particularly advantageous since a minimum amount of trimmings is produced; in fact, in this case the circular form of the dough is not obtained by means of a pressing operation which, as is well-known, may produce a significant amount of processing waste. Consequently, the aforementioned operation of forming by means of dividing results in a significant saving from a cost point of view, due in particular to the smaller amount of raw material used and the simplified machine cleaning operations.

During the aforementioned step d), the aforementioned disk is pressed so as to form an edge with a width of between 2 mm and 8 mm and a height of between 3 mm and 12 mm.

Preferably, the aforementioned pressed disks according to the alternative embodiments described above may have a diameter of between 82 mm and 88 mm and a height of between 4 mm and 8 mm.

Accordingly, with reference to the aforementioned step d), a press of circular section with a diameter of between 60 mm and 88 mm, preferably with a diameter equal to 80 mm, may be used.

The punching operation has the function of pushing the dough situated underneath the press outwards, reducing the thickness of the dough below it and directing the dough outwards, causing it to accumulate externally and along the circumference of the press; said circular edge will thus be formed.

Advantageously, as a result of forming of the edge, a production process which is unexpectedly reliable from a microbiological point of view is provided. In fact, owing to the provision of the aforementioned edge, contact of the topping with the transportation surfaces is reduced during the steps which follow punching and precede packaging, and also correct packaging of the product during the aforementioned step i) is facilitated, avoiding contact between the surfaces of the topping and the packaging film.

During the aforementioned step e), a topping which comprises further a tomato-based sauce with a water activity (Aw) preferably of between 0.90 and 0.95 may be deposited on the aforementioned disk; this tomato-based sauce generally comprises tomato pulp, tomato concentrate, extra virgin olive oil and cooking salt; it may also comprise dried glucose syrup and sucrose.

During the aforementioned cooling step h), the baked pizza obtained may be left to cool to room temperature for a time period of between 25 minutes and 35 minutes down to a temperature of between 20° C. and 25° C.

Furthermore, the particular time, temperature and moisture profile used in the leavening step f), and the particular time and temperature profile for the baking step g) in an oven and during the cooling step h) have been optimized by the inventors so as to obtain a baked pizza with the desired consistency, moisture, taste and appearance.

During the aforementioned packaging step i), the pizza obtained is inserted in a package having a metallized film with air and light barrier properties, for example a plastic multipack, optionally inserted in turn inside a cardboard packaging (box).

The term "pizza" or "pizzetta" is understood here as meaning a bakery product, comprising a base of baked dough and a surface topping, wherein the base is obtained by kneading a dough which comprises flour, water, yeast and cooking salt and optionally vegetable fats and/or oils and/or fractions thereof, this dough being allowed to rise, provided with a filling and then baked. This pizza may typically have a circular shape and, when tasted, offers a balanced contrast between the taste of the baked base and that of the topping which is generally more savory and flavorsome.

The expression "ready-to-eat" used in relation to the pizza according to the invention is understood here as meaning that the pizza is ready to be eaten without the need for any preparation, such as defrosting or baking.

The expression "room temperature" is understood as meaning a temperature of between 18° C. and 35° C.

The term "soft" is understood as meaning that the baked base of soft dough according to the invention has a resistance to compression of between 4 and 8 N, and preferably of about 6 N, measured with a dynamometer Texture Analyzer SMS.

The term "superficial" is understood here as referring to the surface which is exposed upwards during preparation and baking. The term "surface", referring to the pizza, is understood here as always referring to the upper surface, if not otherwise specified.

The expression "unripened cheese" is understood here as meaning a cheese which has not undergone any ripening process, but only an ageing process or has undergone a ripening process with a ripening period of less than six months.

The term "mascarpone" is understood as meaning a dairy product obtained by means of heat-acid coagulation of cow's milk cream by means of the addition of acetic acid or citric acid.

DETAILED DESCRIPTION

Figure 1:
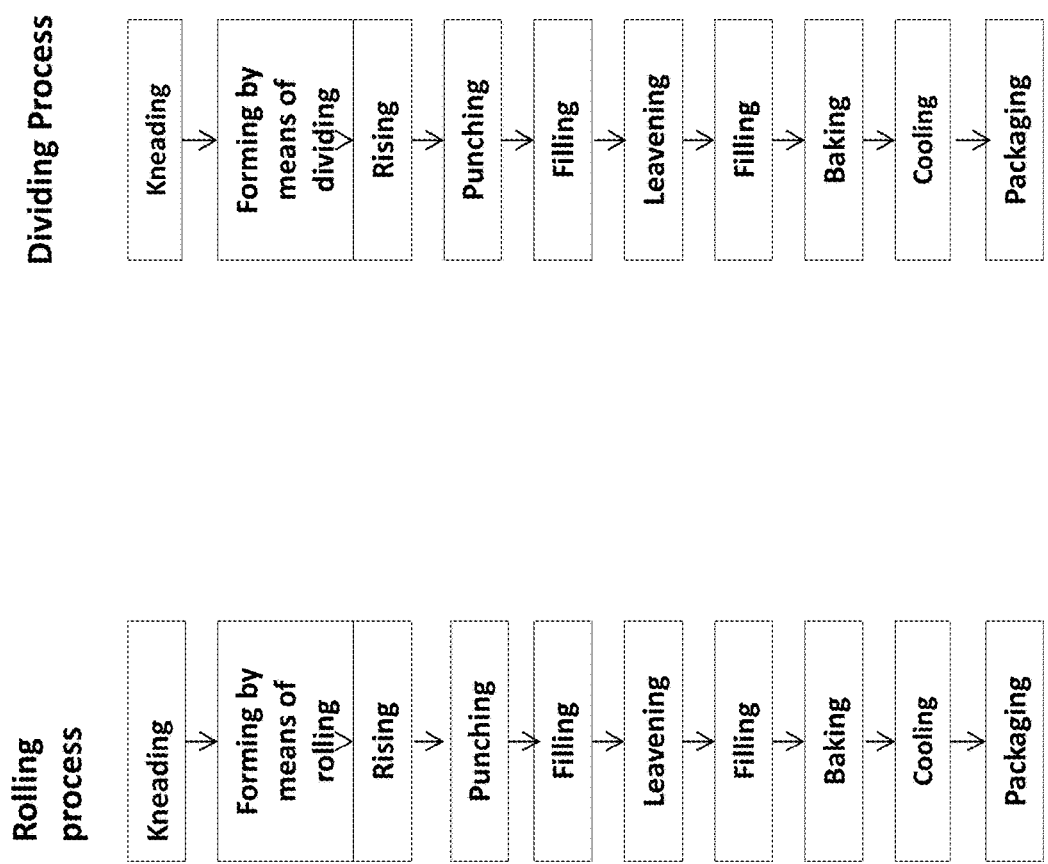
FIG. 1 shows a summary flow diagram of two modes of implementation of the process according to the present invention.

As mentioned above, the present invention provides a ready-to-eat baked pizza packaged for long-term storage at room temperature, having an appearance and organoleptic properties comparable to those of a freshly made pizza, having a base of soft baked dough and a surface topping comprising cheese, said topping being free of preservatives and said base and said surface topping having a substantially equivalent water activity (Aw).

Advantageously, the product according to the invention is provided so that it can be eaten as single portions.

The baked pizzas according to the invention can be stored at room temperature in sealed packages for a period of at least 60 days, preferably for at least 90 days, more preferably for a period of at least 120 days.

The product according to the invention therefore does not require further baking and/or defrosting steps before being eaten. In any case, depending on the personal taste and preferences of the consumer, it is also possible for the product according to the invention to be heated by means of a hot plate or an oven.

In addition, the product according to the invention can be stored at room temperature in packages of the type with metallized film having air and light barrier properties, without having to use a modified atmosphere, for example inert gas (nitrogen, carbon dioxide, etc.), or a vacuum.

An example of metallized films with barrier properties is the film SMML commercially distributed by Manucor, and similar films, also of the double-layer type, which has a water vapor transfer value ($g/m^2/24$ h) of 1 and an oxygen transfer value ($g/m^2/24$ h) of 10, but other types of metallized films which are commercially available may be used, provided that they have air and light barrier properties such as to ensure storage at room temperature for at least 60 days.

Another peculiar characteristic of the baked pizzetta according to the invention is the total absence of preservatives in the surface topping. In a particularly advantageous manner, the present product is a food product with a long shelf-life, even though it has a surface topping comprising cheese, preferably unripened cheese, a foodstuff which normally cannot be stored for long at room temperature.

The product according to the invention may be stored for a long period of time at room temperature, despite the absence of preservatives in the topping which covers its surface, as mentioned above, and can maintain substantially unaltered during this period its organoleptic/structural characteristics also owing to the fact that the aforementioned soft dough cooked base and the aforementioned topping have substantially equivalent water activity values (Aw).

As a result of this substantial equivalence, the transfer of moisture which may occur from the base to the topping is substantially offset by a corresponding transfer of moisture from the topping to the base, and vice versa, such that the alteration of the organoleptic and tasting consistency properties of the base and the topping is kept as small as possible during the entire shelf-life of the product.

The duration of the product may be further prolonged by means of surface treatment with ethyl alcohol, in a maximum amount of 2% in relation to the dried substance of the finished product.

Figure 2:
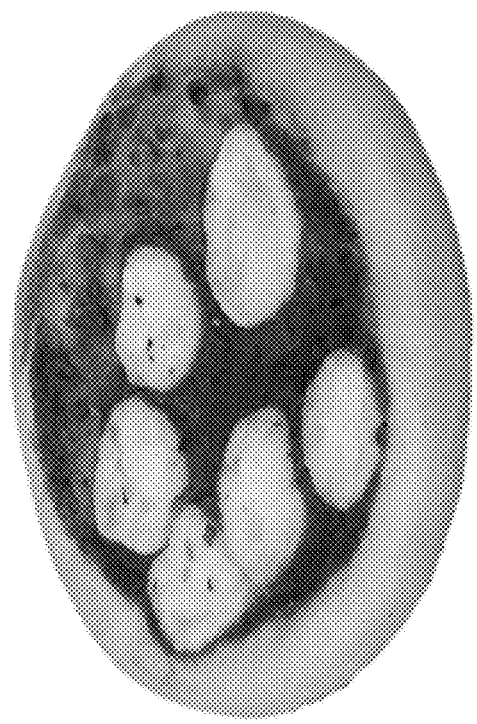
FIG. 2 shows a photograph of a preferred embodiment according to Example 2.

The present invention will be further described with reference to the examples of embodiment illustrated hereinbelow and with reference to FIGS. 1 and 2 by way of a non-limiting example.

Example 1

Pizzetta with Cheese Topping

During a first slow mixing stage, a pizza dough was prepared in a spiral-hook kneader with a slow speed of the reel, i.e. 15 rpm for 1 minute, in an environment regulated to a temperature of 18° C., said dough being formed from the ingredients shown in Table 1, in the amounts indicated. During a second fast mixing stage, at 50 rpm for 12 minutes, the dough obtained following the slow mixing stage was made uniform. At the end, a dough with a total weight of 2.5 kg was obtained.

TABLE 1

Formulation of the dough

| Ingredients | % of total |
| --- | --- |
| Type "0" wheat flour | 58.00 |
| Ascorbic acid | 0.03 |
| Brewer's yeast | 2.30 |
| Fine salt | 2.00 |
| Water | 27.50 |
| Apple cider vinegar | 0.52 |
| Extra virgin olive oil | 1.50 |
| High oleic sunflower oil | 8.15 |
| Total: | 100% |

The raw pizza dough thus obtained was subjected to a rolling forming step. By means of a V4 extruder produced by Rheon Japan with stress-free rollers (to avoid mechanical damage) a continuous layer with a thickness of about 12 mm was obtained. This continuous layer was then passed through a series of sizing rollers using the multiroller stretcher apparatus SM2 produced by Rheon Japan, obtaining a sheet of dough with a thickness of about 10 mm.

Four sheets thus obtained were superimposed on each other in order to increase the elasticity of the dough and were then subjected to a rolling step to obtain a rolled dough with a final thickness of 6 mm.

From the dough thus obtained 80 disks of dough with a diameter of 85 mm and weight of about 26 g were obtained by means of pressing.

In order to obtain correct relaxation of the dough, the disks of dough previously formed were left to stand (rise) for about 30 minutes at a temperature of 22° C. and in an atmosphere with a controlled relative humidity of about 50%.

Then the disks of dough were pressed using a press with circular section of 80 mm diameter, so as to form an edge about 5 mm wide and 10 mm high.

The disks of dough thus obtained then underwent the topping operations. Firstly, the topping was deposited on the disks of dough, inside the aforementioned raised edge; 12 g of a cheese-based mixture with a water activity (Aw) of 0.96, substantially consisting of unripened cheese and mascarpone in a weight ratio of about 80:20 were applied; the unripened cheese used had a soft consistency and comprised pasteurized whole milk, milk cream and salt. Then 4 g of frozen pitted black olives cut into small rings and 0.1 g of crushed and dried oregano leaves were deposited on the disks of dough, inside the aforementioned raised edge, already topped with the cheese-based mixture.

This was followed by a leavening procedure in a cell at a temperature of 34° C. for a time period of 75 minutes and in an atmosphere with a controlled relative humidity of about 90%.

Once leavening had been completed, the disks of dough were baked in a convection oven at an average temperature of 210° C. for 9 minutes, obtaining the soft baked dough oven products according to the invention, in the form of circular pizzettas. Upon leaving the oven the pizzas had a thickness of about 5 mm in the central part and a thickness along the edge of about 10 mm.

Within two minutes of leaving the oven the pizzas were removed from the baking tray and were placed on a mesh tray for about 30 minutes so as to cool to a temperature of about 22° C.

Once the temperature of 25° C. was reached, the product was sent to the packaging machines and each single pizzetta was packaged in a case-like package consisting of metallized film with air and light barrier properties.

A single pizzetta produced in accordance with Example 1 weighed about 41 g.

Example 2

Pizzetta with Cheese Topping and Tomato-Based Sauce

In this case, a pizza was prepared using a pizza dough formulated according to the recipe shown in Example 1.

During a first slow mixing stage, a pizza dough was prepared in a spiral-hook kneader with a slow speed of the reel, i.e. 15 rpm for 1 minute, in an environment regulated to a temperature of 18° C., said dough being formed from the ingredients shown in Table 1, in the amounts indicated. During a second fast mixing stage, at 50 rpm for 12 minutes, the dough obtained following the slow mixing stage was made uniform. At the end, a dough with a total weight of 2.5 kg was obtained.

The raw pizza dough thus obtained was subjected to a forming step with dividing by means of a divider-rounder, this continuous layer being cut and divided into balls with a weight of 26 g each. The balls thus obtained were rolled until disks of dough with a diameter of 85 mm and a height of 6 mm were obtained.

In order to obtain correct relaxation of the dough, the disks of dough previously formed were left to stand (rise) for about 30 minutes at a temperature of 23° C. and in an atmosphere with a controlled relative humidity of about 50%.

Then the disks of dough were pressed using a circular-section press of 80 mm diameter, so as to form an edge about 5 mm wide and 10 mm high.

The disks of dough thus obtained then underwent the topping operations. Firstly, the topping was deposited on the disks of dough, within the aforementioned raised edge, followed by application of 9 g of tomato-based sauce with a water activity (Aw) of 0.93 formulated from the ingredients shown in Table 2, in the amounts indicated.

TABLE 2

| Ingredients of the tomato-based sauce | |
|---|---|
| Tomato pulp | 30.87 |
| Tomato concentrate | 33.67 |
| Extra virgin olive oil | 4.21 |
| Salt | 1.98 |
| Wheat maltodextrin | 17.96 |
| Dried glucose syrup | 9.82 |
| Sugar | 0.42 |
| Dried oregano | 0.56 |
| Fatty acid mono and diglycerides | 0.51 |
| Total: | 100% |

8 g of a cheese-based mixture with a water activity (Aw) of 0.95, substantially consisting of unripened cheese and mascarpone in a weight ratio of about 78:22, were then applied; the unripened cheese used had a soft consistency and comprised pasteurized whole milk, milk cream and salt.

This was followed by a leavening procedure in a cell at a temperature of 34° C. for a time period of 75 minutes and in an atmosphere with a controlled relative humidity of about 90%.

Once leavening had been completed, the disks of dough were baked in a convection oven at an average temperature of 210° C. for 10 minutes, obtaining the soft baked dough oven products according to the invention, in the form of circular pizzettas. Upon leaving the oven the pizzas had a thickness of about 5 mm in the central part and a thickness along the edge of about 10 mm.

Within two minutes of leaving the oven the pizzas were removed from the baking tray and were placed on a mesh tray for about 30 minutes so as to cool to a temperature of about 22° C. Once the temperature of 25° C. was reached, the product was sent to the packaging machines and each single pizzetta was packaged in a case-like package consisting of metallized film with air and light barrier properties.

A single pizzetta produced in accordance with Example 2 weighed about 38 g.

The pizzas according to the Examples 1 and 2 both had organoleptic and appearance characteristics comparable to those of a freshly made pizza. Each pizza is substantially covered by the topping in its central part; the topping is well distributed over all the upper surface of the pizza, within the raised edge. The non-covered surface of the topping corresponds substantially to the raised edge of the pizza. The edge has a varyingly gold colour with lighter zones and darker zones tending towards brown.

When tasting the pizza according to the present invention, the balanced, slightly salty taste of the cooked base alternates with that of the topping, which has an intense, almost bitter-sweet taste. Also noticeable is the slightly bitter taste of the extra virgin olive oil which is present both in the dough of the base, and in the tomato-based sauce, when included in the topping. When chewed, the pizza is soft, but not rubbery.

In terms of aroma, the pizza has a reasonably intense fragrance, with a sweetish sensation owing to the topping comprising unripened cheese, and warm, aromatic and balsamic overtones owing to the olive oil, oregano and/or tomato-based sauce, if present. The aroma of bread or bread crust is also markedly perceptible.

The pizzas according to Examples 1 and 2 above maintained substantially unchanged their organoleptic/structural properties during the entire shelf-life (70 days), being moreover in an excellent condition from a microbiological point of view.

The invention claimed is:

1. A ready-to-eat baked pizza, packaged for storage at room temperature comprising:
    a base of soft baked dough having a whole circumference length and a surface topping, said surface topping defining a visible top for said pizza and comprising a cheese-based phase and a phase of tomato-based sauce positioned intermediate said cheese-based phase and said base, said topping being free of preservatives and said base and said surface topping having a substantially equivalent water activity (Aw),
    wherein said cheese-based phase and said phase of tomato-based sauce are visibly separate and abut each other, and said phase of tomato-based sauce having a water activity (Aw) of between 0.80 and 0.92 and a moisture content with a value of between 36% and 40% by weight of the total weight of said phase of tomato-based sauce, said phase of tomato-based sauce further comprising emulsifiers in an amount of between 0.30% and 0.7% by weight of the total weight of said phase of tomato-based sauce to inhibit migration of fatty components in said tomato-based sauce to said cheese-based phase and to said base;
    wherein the base of soft baked dough has a raised circular edge consisting of soft baked dough;
    wherein said raised circular edge is on the side of the base containing the surface topping, said raised edge extending away from the surface topping side of the base and extending the whole circumference length of the pizza;
    wherein said surface topping is disposed on an interior surface area defined by said raised circular edge;
    wherein said cheese-based phase of said surface topping is visible;
    wherein said raised circular edge presses against a package containing said pizza thereby minimizing contact between said surface topping and said packaging and minimizing said surface topping not being uniformly distributed on the surface of said soft baked dough base; and
    wherein moistening agents are absent from said soft baked dough.

2. The pizza according to claim 1, wherein said pizza has a water activity (Aw) of between 0.80 and 0.92 and an overall moisture content of between 26% and 30% by weight of the total weight of the pizza.

3. The pizza according to claim 2, wherein said pizza has a water activity (Aw) of between 0.84 and 0.88.

4. The pizza according to claim 1, wherein said base of baked dough has a water activity (Aw) of between 0.80 and 0.92 and a moisture content of between 28% and 32% by weight of the total weight of said base of baked dough.

5. The pizza according to claim 4, wherein said base of baked dough has a water activity (Aw) of between 0.84 and 0.88.

6. The pizza according to claim 1, wherein said base of baked dough comprises flour, a leavening agent of natural origin and cooking salt.

7. The pizza according to claim 6, wherein said base of baked dough further comprises apple cider vinegar, vegetable oils or fats and a baking processing aid.

8. The pizza according to claim 1, wherein said topping has a water activity (Aw) of between 0.80 and 0.92 and a moisture content with a value of between 20% and 24% by weight of the total weight of said topping.

9. The pizza according to claim 8, wherein said topping has a water activity (Aw) of between 0.84 and 0.88.

10. The pizza according to claim 1, wherein said cheese-based phase also comprises mascarpone.

11. The pizza according to claim 10, wherein said cheese and said mascarpone are contained in said cheese-based phase in a weight ratio of between 75:25 and 85:15.

12. The pizza according to claim 1, wherein said phase of tomato-based sauce has a water activity (Aw) of between 0.84 and 0.88.

13. The pizza according to claim 1, wherein said cheese-based phase and said phase of tomato-based sauce have a substantially equivalent water activity (Aw).

14. The pizza according to claim 1, wherein said topping of said pizza comprises any one of the group consisting of whole or chopped olives, oregano, basil, rosemary, fruits, dehydrated tomatoes, capers, onions, artichokes, mushrooms, anchovies, cured meats, and combinations thereof.

15. The pizza according to claim 1, wherein said pizza has a rounded shape with a diameter of between 5 cm and 18 cm.

16. The pizza according to claim 1, wherein said package comprises a metallized film with air and light barrier properties.

17. The pizza according to claim 7, wherein said vegetable oils or fats are extra virgin olive oil, high oleic sunflower oil or a mixture thereof.

18. The pizza according to claim 1, wherein said surface topping covers a majority of said base of baked dough.

19. The pizza according to claim 1, wherein said raised circular edge has a thickness of between 0.5 cm and 1.5 cm, and a width of between 0.5 cm and 1.5 cm; and wherein said raised circular edge has a thickness of about 200 percent greater than the thickness of the pizza at a central part of the pizza.

* * * * *